United States Patent

[11] 3,598,921

[72] Inventors T. O. Paine
Administrator of the National Aeronautics and Space Administration with respect to an invention of;
Leonard Kleinrock, Los Angeles, Calif.

[21] Appl. No. 813,494
[22] Filed Apr. 4, 1969
[45] Patented Aug. 10, 1971

[54] METHOD AND APPARATUS FOR DATA COMPRESSION BY A DECREASING SLOPE THRESHOLD TEST
12 Claims, 2 Drawing Figs.

[52] U.S. Cl. .......................................................179/15.55 R
[51] Int. Cl. ....................................................... H04b 1/66
[50] Field of Search ....................................................... 179/15.55
R, 15 AP; 325/38 A, 38 B; 178/68, DIG. 3; 332/11
D

[56] References Cited
UNITED STATES PATENTS

| | | | |
|---|---|---|---|
| 3,151,296 | 9/1964 | Phyfe | 325/141 |
| 3,378,641 | 4/1968 | Vargos | 179/15.55 |
| 3,500,441 | 3/1970 | Brolin | 325/38.1 |

*Primary Examiner*—Kathleen H. Claffy
*Assistant Examiner*—Jon Bradford Leaheey
*Attorneys*—J. H. Warden, Monte F. Mott and G. T. McCoy

ABSTRACT: A method and apparatus is disclosed for data compression by a decreasing slope threshold test in which the data stream is examined and only those samples are selected for transmission which have a slope (first difference or first derivative) that exceeds an exponentially decreasing range established by a decreasing voltage added to and subtracted from a slope measurement at the time the last sample was transmitted. The time between successive transmissions is also transmitted in order that the reconstructed function may be formed by linear interpolation of the transmitted samples.

INVENTOR.
LEONARD KLEINROCK

BY [signature]

ATTORNEYS

PATENTED AUG 10 1971

3,598,921

INVENTOR.
LEONARD KLEINROCK

BY

ATTORNEYS

METHOD AND APPARATUS FOR DATA COMPRESSION BY A DECREASING SLOPE THRESHOLD TEST

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435;42 USC 2457).

BACKGROUND OF THE INVENTION

This invention relates to a method and apparatus for compression of data to be transmitted.

In the art of telemetering analog data, it is standard practice to sample the data periodically, along with other data, on a time division basis by multiplexing between channels of data. The analog data of a given channel can be reconstructed accurately at the receiver from the periodic samples, provided the sampling rate is not less than the Nyquist rate of the channel data, which is at least twice as high as the highest frequency component of the analog data signal. Various techniques have been devised for compressing the data to be transmitted for a given channel in order that more channels be multiplexed for a given transmission bandwidth. For example, one technique that has been proposed is the sampling and transmission of only maxima and minima data.

SUMMARY OF THE INVENTION

The present invention comprises a method and apparatus for compression of analog data in which the analog data is continuously examined and selected for transmission only when the slope (first difference or first derivative) of the analog data falls outside a narrowing range of values established by a decreasing voltage added to and subtracted from a slope measured at the time the last value was selected for transmission. Sample index data is transmitted with the sample value selected in order that the analog data may be reconstructed by linear interpolation of the transmitted data.

This method is implemented in an analog system by periodically sampling the analog data to form a stream of analog voltage samples $f_n$, obtaining the difference between successive samples $f_n{}^1{}_1$ and $f_n$, comparing that difference with a pair of symmetrically decreasing voltages, and transmitting the sample $f_n{}^1{}_1$ when this difference crosses either threshold. At substantially the same time as this threshold is crossed, the symmetrically decreasing voltages are restored using the difference $\Delta f_n$ equal to $f_n - f_n{}^1{}_1$ as a new reference. A counter is used for establishing the index number $n$ of the samples $f_n$. Sample index data is transmitted with each selected sample. This index data may be coded for efficiency or, as in an illustrative embodiment disclosed herein, may be represented as the difference between the index of the currently transmitted sample value and the index of the next most recent sample value transmitted; this difference may then be coded for greater efficiency.

The novel features that are considered characteristic of this invention are set forth with particularity in the appended claims. The invention will best be understood from the following description when read in connection with the accompanying drawings.

DESCRIPTION OF THE PREFERRED EMBODIMENT

Figure 1:
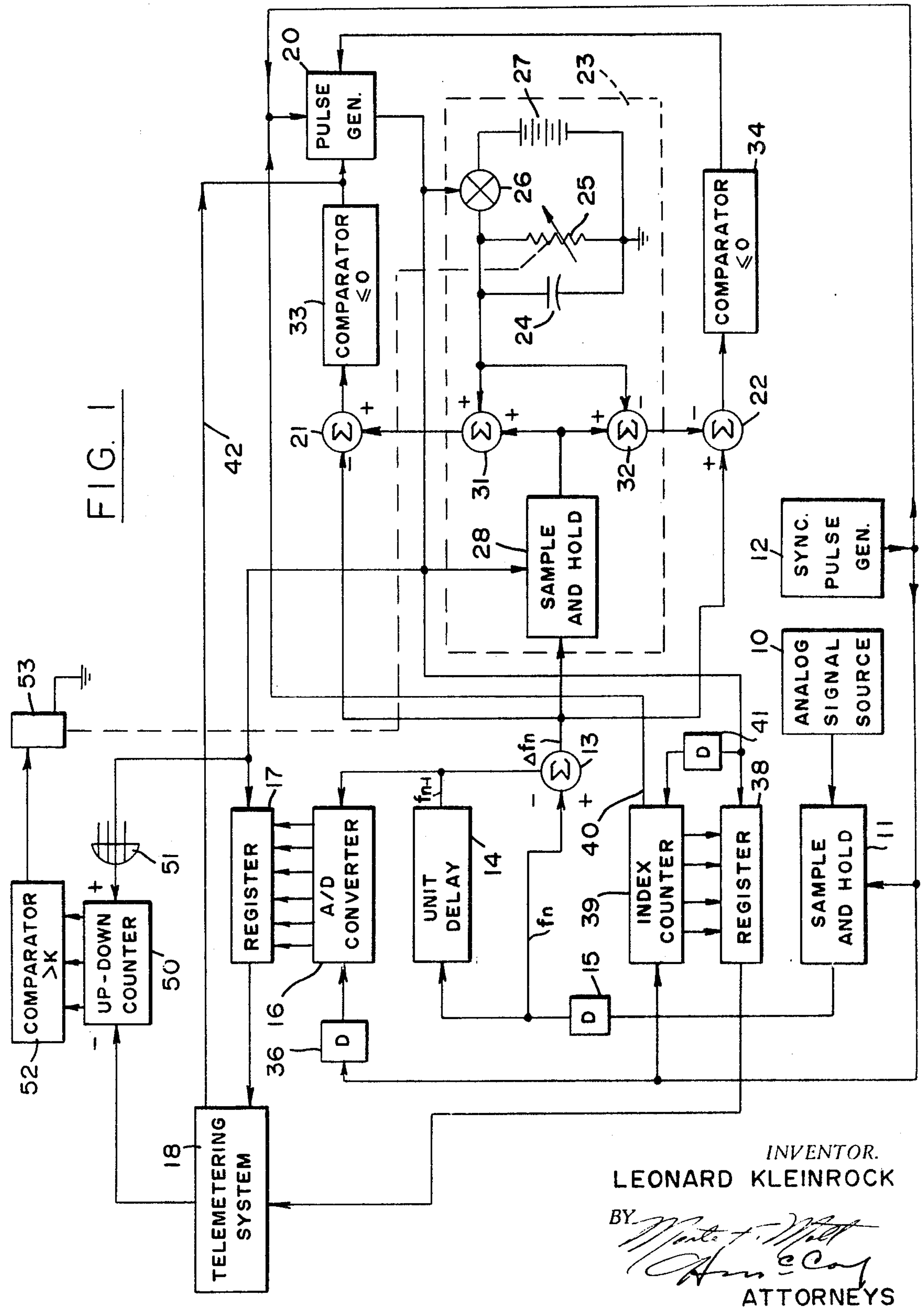
FIG. 1 is a block diagram of the system of the present invention.

Referring now to the drawings, the decreasing slope-threshold method of compressing data is implemented in an analog form by converting an analog signal from a source 10 into an input data stream $f_n$ where $n$ is an index number of the raw data sequence. A sample and hold circuit 11 responds to pulses from a synchronizing pulse generator 12 to create that raw data sequence, each sample of data comprising a voltage having an amplitude and polarity equal to the amplitude and polarity of the analog input signal at the time the sampler 11 is actuated by a synchronizing pulse. The pulse width of each synchronizing pulse is substantially shorter than the period between samples.

The raw data sequence $f_n$ is applied to a summing network 13 and a unit delay operator 14 via a short delay line 15. The output of the unit delay operator 14 is $f_n{}^1{}_1$, the raw data sequence delayed a period equal to one cycle of pulse generator 12. Accordingly, the output of the unit delay operator 14 is labeled $f_n{}^1{}_1$.

The summing network 13 may be a conventional operational amplifier having a negative feedback resistor of the same resistance value as input coupling resistors in a conventional manner. The minus (−) sign adjacent one input indicates the value represented by the signal at that input is to be inverted for subtraction from the signal at the other terminal. Therefore, the summing circuit includes an inverter at the minus input thereof. It also includes an inverter at the output since an operational amplifier provides an inverted output. For convenience, it may be assumed that all other networks represented by the same symbol (Σ) are identical to the summing network 13, although in practice an inverter at an input of one having a minus sign may be omitted if the inverter at the output of another connected thereto is also omitted.

The delayed data sequence $f_n{}^1{}_1$ is algebraically subtracted from the raw data sequence $f_n$ by the summing network 13 to provide, at an output thereof, the difference $\Delta f_n$ between two successive samples $f_n$ and $f_n{}^1{}_1$ of the analog signal from the source 10 according to the equation $$\Delta f_n = f_n - f_n{}^1{}_1 \qquad (1)$$

The delayed raw data sequence $f_n{}^1{}_1$ is also applied to an analog-to-digital converter 16 in order that the value selected from the sampled data sequence $f_n$ for transmission will be available in digital form for transfer to a buffer register 17 when a sampling command pulse is received from a pulse generator 20. From there it is transmitted to a telemetering system 18, or other system. For some applications, such other system may include magnetic tape for storage, leaving the data processing to be accomplished at a later time.

The voltage difference $\Delta f_n$ is applied to a pair of summing networks 21 and 22 for respective operations of subtraction and addition to a pair of symmetrically decreasing slope-threshold voltages developed by a circuit 23 in accordance with the following equations:

$$T_U(n) = \Delta f_{n\,m+1} + a \exp - b(n - n_m - 1) \qquad (2)$$

$$T_L(n) = \Delta f_{n\,m+1} - a \exp - b(n - n_m - 1) \qquad (3)$$

where $n_m$ is the index of the $m$the sample selected for transmission. That exponentially decaying voltage ($a \exp - b\,(n - n_m - 1)$) is stored in a capacitor 24 which discharges through a variable resistor 25. The time constant $1/b$ is thus determined by the capacitor 24 and resistor 25. The initial voltage ($a$) is transferred to the capacitor 24 via a low-impedance switch 26 from a source 27 represented as a battery having its positive terminal connected to the switch 26.

The voltage difference $\Delta f_n$ is stored in a sample and hold circuit 28 in response to a pulse from the generator 20, and from there applied to a pair of summing networks 31 and 32 through a high input impedance device such as insulated gate, field effect transistors at the inputs of the summing networks 31 and 32. The network 31 adds the exponentially decaying voltage stored in the capacitor 24 to the voltage $\Delta f_{n\,m+1}$ while the network 32 subtracts the exponentially decaying voltage to the difference voltage $\Delta f_{n\,m+1}$. In that manner, the difference voltage $\Delta f_{n\,m+1}$ is employed to bias the exponentially decaying voltages $\pm a \exp - b(n - n_m - 1)$.

The difference voltage $\Delta f_n$ is applied to the summing networks 21 and 22 which produce output voltages of respective values equal to $-\Delta f_n + T_U(n)$ and $\Delta f_n - T_L(n)$.

If the output of either summing network 21 or summing network 22 is less than or equal to 0 volts, the difference voltage $\Delta f_n$ currently being received from the summing network 13 is outside the range of voltages defined by the then existing upper and lower threshold voltages $T_U(n)$ and $T_L(n)$. Therefore, in accordance with the novel method of data compression being implemented, the delayed sample $f_n{}^1{}_1$ should be transmitted and the upper and lower thresholds $T_U(n)$ and $T_L(n)$ reset with reference to the then existing difference voltage $\Delta f_n$. That is accomplished by a pair of comparators 33 and 34 which compare the output voltages of the summing networks 21 and 22 to 0 A properly biased Schmitt trigger circuit may be employed for each of the comparators 33 and 34.

The output of either of the comparators 33 and 34 (actuated by an input signal thereto equal to or less than 0 volts) triggers the pulse generator 20 which transmits a pulse of a predetermined period (less than cycle period of the synchronous pulse generator 12) in synchronism with the leading edge of the next pulse transmitted by the generator 12. In that manner the buffer register 17 is actuated to receive in digital form the value $f_n{}^1{}_1$ for transmission to the telemetering system 18 before the analog-to-digital converter 16 is recycled via a delay line 36.

The delay line 36 provides a delay slightly longer than the delay line 15 in order that the unit delay operator 14 store the present voltage $f_n$ as the voltage $f_n{}^1{}_1$ for the next period. In the meantime, the pulse from the generator 20 actuates the gate 26 to recharge the capacitor 24 to the full value of the battery 27, actuates the sample and hold network 28 to store the then existing $\Delta f_n$ as $\Delta f_{n_m}$ before a new sample is transmitted by the sampler 11 to the summing network 13 via the delay line 15, and actuates the buffer register 17.

The pulse from the generator 20 also actuates a buffer register 38 to cause it to receive from a counter 39 sample index data for transmission to the telemetering system 18. Thereafter, the index counter 39 is reset via a delay line 41. Thus the index data to be transmitted for a particular sample $f_n{}^1{}_1$ is relative in that it is a number which represents the number of synchronizing pulses transmitted by the generator 12 since the last sample of the analog input signal was selected for transmission. Otherwise, the index number could get too large for economic transmission.

The counter 39 would, of course, have some finite capacity for counting the number of sampling periods. Ideally, that capacity is selected to be greater than the longest constant slope period of the analog signal source 10, or at least an average constant slope period. Once the counter 39 overflows, a pulse is transmitted over a line 40 to trigger the pulse generator 20, thereby forcing a sample to be transmitted. The sample index number transmitted would then be 0...000, signifying that index data transmitted thereafter is relative to that transmitted sample.

Regardless of the capacity of the index counter 39, the sample index data may be coded for efficient transmission by the telemetering system. Such a code system may consist of a variable-length code for those sample indexes which are statistically the ones to be most frequently transmitted. For example, codes may be assigned to particular sample indexes according to their probability of occurrence in the following manner (using a Huffman coding procedure):

| Probability | Sequence | Code |
|---|---|---|
| 0.5 | 000 | 0 |
| 0.2 | 001 | 10 |
| 0.05 | 010 | 1100 |
| 0.05 | 011 | 1101 |
| 0.05 | 100 | 11100 |
| 0.05 | 101 | 11101 |
| 0.05 | 110 | 11110 |
| 0.05 | 111 | 11111 |

Other schemes could, of course, be employed.

To initiate the slope testing procedure, the pulse generator 20 is triggered by a start pulse from the telemetering system via a line 42. That will cause a sample to be transferred into the register 18. At the same time, the symmetric threshold voltages are reset to initiate a search for the next sample to be transmitted. Thereafter, before the next synchronizing pulse is transmitted by the generator 12, the index counter 39 is reset in order that the index number transmitted with the next sample be relative to the time the first sample was transmitted.

In this embodiment, the analog input is sampled in time to create a raw data sequence. This need not be the case, however. The method will also work without the sample-and-hold circuit 11, in which case the first derivative of the continuous analog signal $f(t)$ is continually tested. That would require substituting for the summing network 13 a differentiating network. In that manner, the differentiating network will produce a signal having an amplitude proportional to the first derivative of the analog signal $f(t)$ for sampling by the circuit 28 instead of the difference $\Delta f_n$. The sample index is now the time $t$ and is transmitted, and the reconstructed function is a linear interpolation of samples as before. Thus, in the broadest aspects of the present invention, the first derivative of the analog input signal $f(t)$ against a symmetric pair of decreasing reference voltages is equivalent to testing the first difference $f_n - f_n{}^1{}_1$. In either case, the function of the input signal need not be continuous.

Figure 2:
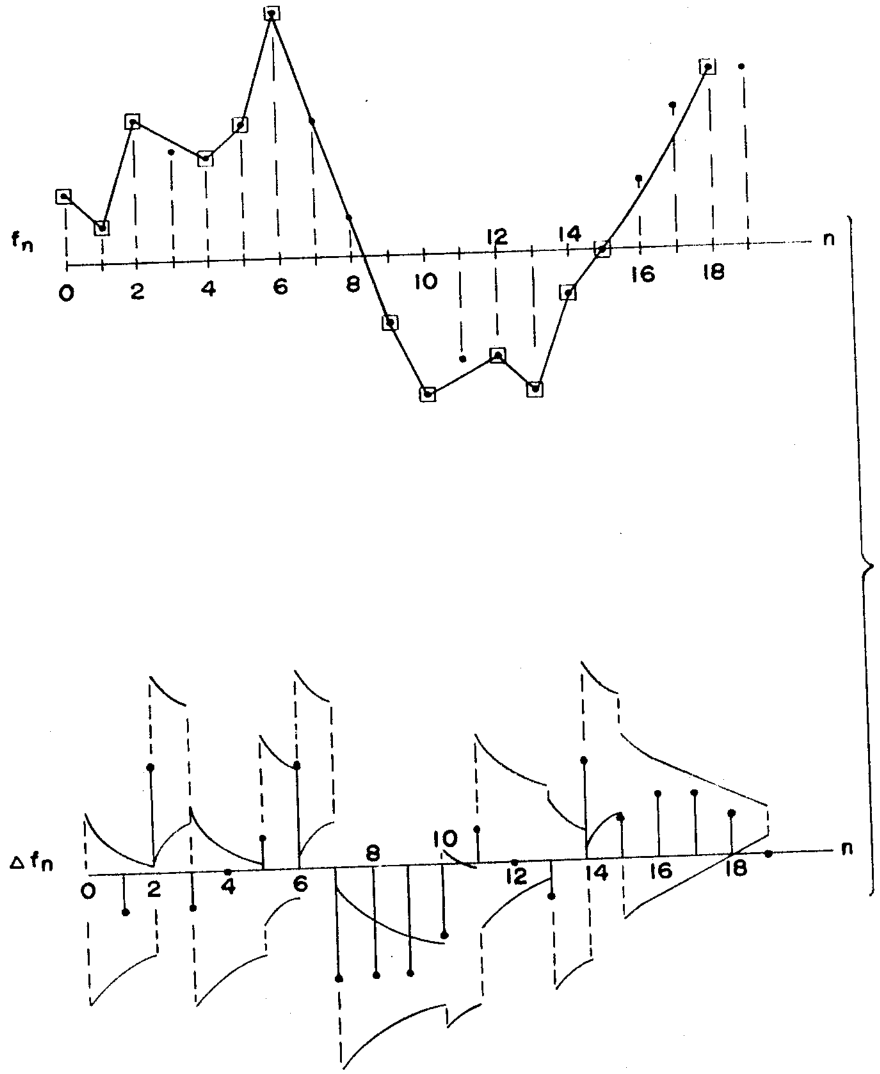
FIG. 2 is a waveform diagram illustrating the method of data compression implemented by the system of FIG. 1.

The method of data compression in accordance with the present invention will now be described with reference to waveform diagrams for voltage values $f_n$ and $\Delta f_n$. For convenience, the sample periods are numbered consecutively and many function values are transmitted. The transmitted function values are represented in the waveform by dots enclosed by squares. The dots not so enclosed then represent function values not transmitted because the slope (difference between that point and the next sample point of the first derivative of the function at that point) does not fall outside limits set by a symmetric pair of decreasing threshold voltages shown in a graph of FIG. 2 for a plot of $\Delta f_n$ voltages. Each voltage $\Delta f_n$ is represented by a dot at respective sample periods.

As noted hereinbefore, when either threshold voltage $T_U$ or $T_L$ is exceeded by a particular voltage $\Delta f_n$, the data sample $f_n{}^1{}_1$ is transmitted and the threshold voltages $T_U$ and $T_L$ are reset in order that the slope test may begin again. For example, the difference $\Delta f_n$ at index 6 is not within the symmetric pair of decreasing threshold voltages $T_U$ and $T_L$ shown at the index. Therefore, the sample value $f_n{}^1{}_1$ at index 5 is selected for transmission. At the same time, the upper and lower threshold $T_U$ and $T_L$ are reset to restore their original values ($+a$ and $-a$) with respect to the difference $\Delta f_n$ at index 6 as a reference.

The difference $\Delta f_n$ at index 7 is also not within the symmetric pair of decreasing threshold voltages set at index 6. Therefore, the value at index 6 is selected and the difference $\Delta f_n$ at index 7 is used for the reference in again establishing initial values ($+a$ and $-a$) for the symmetric pair of decreasing threshold voltages for the next and subsequent slope test periods. The value of the next two differences $\Delta f_n$ at indexes 8 and 9 are within the symmetric pair of decreasing threshold voltages initiated at index 7. Accordingly, the function values at indexes 7 and 8 are not selected. The following difference $\Delta f_n$ at index 10 is not within the symmetric pair of decreasing threshold voltages set at the index 7 so the function value at index 9 is selected and the symmetric pair of decreasing threshold voltages is reset.

An advantage of this slope threshold method of data compression is that in the case of an accidental triggering of the pulse generator 20 (thus causing an unnecessary sample to be transmitted) the slope threshold test will not thereafter be invalid. The only penalty for the accident is a very slight decrease in the data compression ratio. Another important characteristic, which is different from other data compression methods, is that large slope changes (large first derivatives or first differences) are detected to cause samples to be transmitted even with small amplitude changes. Other systems respond only to large amplitude changes, and very often small amplitude variations are just those in which one is interested. Another feature of this method is that its implementation is extremely simple, and a gross data compression ratio of about 6 to 1 is achieved. For example, in transmitting television data by compressing a matrix of 200×200 dots, a gross compression ratio of 5.95 to 1 was achieved without degradation in the transmitted picture being detected by an untrained observer. For some applications, a gross compression ratio of more than 10 to 1 may be used. However, with transmission of timing data, the compression ratio is reduced by 20 to 50 percent, depending upon the efficiency of the particular coding scheme employed. Another advantage is that the reconstructed function may be a linear interpolation of the transmitted samples which is so simple to implement. Still another advantage is that the raw data stream $f_n$ could be quantized to more than six bits as suggested in FIG. 1 by the A/D converter 16 and still obtain a better reconstructed function with fewer bits by compressing the data using this method than by transmitting all samples quantized to six bits.

Although an analog system is disclosed for implementing the novel process of this invention, it should be appreciated that a digital system may be employed as well. For example, by including an analog-to-digital converter in the circuit 11, and a register for the unit delay operator 14, the analog-to-digital converter 16 would then not be required. The difference $\Delta f_n$ could be readily implemented by a subtractor (or an adder upon forming the two's complement of the sample $f_n{}^1{}_1$) in a manner well-known to those skilled in the art. The circuit 23 could be readily implemented to form $T_U$ and $T_L$ in digital form by adding and subtracting numbers to the last difference $\Delta f_{n_m}$ stored in a register provided in place of the sample-and-hold circuit 28. With each sample $f_n$ and the threshold levels $T_U$ and $T_L$ in digital form, the combined functions of the summing networks 21 and 22 with respective comparators 33 and 34 could be implemented by two digital comparators to determine directly when $\Delta f_n \geq T_U(n)$ or when $\Delta f_n \leq T_L(n)$. The levels $T_U$ and $T_L$ may be caused to decrease as a function of $n$ either linearly or exponentially. If linearly, the implementation called for is simply decrementing and incrementing $T_U$ and $T_L$ by a predetermined number, such as one, every period defined by the pulse generator 12. If the pulse generator 20 has not been triggered by the time $T_U$ and $T_L$ cross because the slope of the function $f(n)$ remained constant, the next slope-threshold test will surely cause the pulse generator 20 to be triggered.

Another modification which may be used to advantage in practicing the present invention involves increasing or decreasing the compression ratio in a fashion which adapts the apparatus to the capability of the telemetering system 18 by increasing or decreasing, respectively, the variable resistor 25. Alternatively, the initial voltage ($a$) may be increased to increase the compression ratio and decreased to decrease the compression ratio. Still another way to vary the compression ratio is to vary the capacitor 24. In each case, the change may be made by the system using the invention to provide a self-adaptive data compression system.

For example, the telemetering system 18 may include means for varying the resistor 25 to increase the compression ratio when the number of data samples being stored in a buffer memory reaches a predetermined number. That could be easily implemented by an up-down counter 50 incremented via an OR-gate 51 each time the pulse generator 20 is triggered and decremented each time the telemetering system reads out of a buffer memory a sample for transmission. Other input terminals of the OR-gate 51 are connected to other systems (not shown) which transmit data to the buffer memory of the telemetering system 18.

A comparator 52 monitors the counter 50 and energizes a solenoid 53 when the number in the counter 50 exceeds a predetermined number K. The solenoid 52 then varies the resistor 25 from one predetermined value to another to increase the compression ratio. When the number in the counter 50 no longer exceeds the number K, the relay 52 is deenergized to restore the original value of the resistor 25. Further changes may be readily implemented by other comparators and relays, or their equivalents, for multilevel control of the compression ratio.

Regardless of how the data compression system is implemented, this self-adaptive feature may also be included to modify the data compression ratio for particular operating conditions of the telemetering system.

Although a telemetering system has been referred to in the illustrated embodiment, it should be understood that the present invention is not limited to the telemetering applications. For example, the present invention may be used to advantage in television communications because of the ease of implementation.

Accordingly, it is not intended that the scope of the invention be determined by the disclosed embodiments, but rather only by the breadth of the appended claims.

I claim:

1. A method for data compression of a given function of time by a decreasing slope-threshold test comprising the steps of testing the slope of said function and producing a voltage signal proportional to a given slope, the polarity of said signal corresponding to the sign of said given slope, comparing said given slope voltage signal with a symmetric pair of threshold voltages decreasing from initial positive and negative levels with respect to a given reference independent of the reference of said given slope voltage signal, sampling said function when said given slope voltage signal exceeds either of said threshold voltages, resetting said threshold voltages to initial positive and negative levels with reference to said given slope voltage signal to begin a search for the next sample of said function to be transmitted in the same manner, and noting the time said function was sampled.

2. A method of data compression of a periodic sequence $f_n$ of values for a function of time where $n$ is a timing index for said sequence of values, comprising the steps of periodically testing the slope of said function and producing a voltage signal proportional to said slope, the polarity of said signal corresponding to the sign of said slope, comparing said slope voltage signal with a symmetric pair of threshold voltages decreasing from initial positive and negative levels with respect to a given reference independent of the reference of said voltage signal, sampling said function value at period $n-1$ when said slope voltage signal exceeds either of said threshold voltages, and simultaneously resetting said threshold voltages to initial positive and negative levels with reference to said voltage signal proportional to the slope of said function to begin a search for the next sample of said function to be selected in the same manner, and reading out said timing index for said function value selected.

3. A method as defined in claim 2 wherein the first step of testing the slope of said function comprises obtaining the difference $\Delta f_n$ between said function at period $n$ and said function at period $n-1$ in accordance with the following equation $$\Delta f_n = f_n - f_n{}^1{}_1$$

4. A method as defined in claim 2 wherein the first step of testing the slope of said function comprises obtaining the first derivative of said function at the period index $n-1$.

5. A method as defined in claim 2 wherein said timing index is recycled when said slope voltage signal exceeds either of said threshold voltages to provide an index number representing the time a function value is selected relative to the time a function value was last selected.

6. A method as defined in claim 2 wherein said timing index read out is encoded for efficient transmission with said function value selected.

7. Apparatus for compression of function data comprising:

first means for examining said data periodically to determine the slope of said function;

second means for determining when a given slope value falls outside a narrowing range of values centered about a reference independent of said given slope;
third means responsive to said second means for sampling said function when said given slope falls outside said narrowing range of values;
fourth means responsive to said second means for resetting said narrowing range of values to a predetermined maximum range centered about said given slope value to begin searching again for when a given slope value falls outside the recentered narrowing range of values; and
indexing means for indicating when said function is sampled a given time with reference to other sampling times.

8. In a telemetering system, apparatus for data compression of a periodic sequence $f_n$ of values for a given function of time, where $n$ is a timing index for said sequence of values, comprising:
first means for receiving said sequence of values in series and for determining the difference between each pair of successive values by subtracting a given value of a given timing index $n-1$ from the value having the next succeeding index $n$;
second means for determining when said difference falls outside a decreasing range of differences centered about an independent difference;
third means responsive to said second means for sampling said value having an index $n-1$ when said difference exceeds said decreasing range of differences;
fourth means for counting periods of said sequence; and
means responsive to said sampling means for resetting said decreasing range of differences to a maximum range centered about said difference falling outside said decreasing range.

9. In a telemetering system, apparatus as defined in claim 8 wherein said sequence $f_n$ of values are represented by analog voltages, said first means comprises analog means for receiving said sequence of values through a unit delay operator for subtraction from said sequence of values received directly, and said second means comprises fifth means for subtracting said difference from an analog voltage representing the upper value of said decreasing range, sixth means for subtracting said analog voltage representing the lower value of said decreasing range from said difference, and seventh means for determining when the output signal of either of said fifth and sixth means is equal to or less than zero.

10. In a telemetering system, apparatus as defined in claim 9 wherein said analog voltages representing upper and lower voltages of said decreasing range in said second means are generated by apparatus comprising:
a capacitor having a discharge path through a resistor;
switching means responsive to said second means for storing in said capacitor a voltage of a predetermined amplitude and polarity when said difference falls outside said decreasing range of differences;
holding means responsive to said second means for sampling and holding a voltage representing said difference when said difference falls outside said decreasing range of differences;
summing means for adding a decreasing voltage stored in said capacitor to said voltage representing said difference in said holding means; and
summing means for subtracting a decreasing voltage stored in said capacitor to said voltage representing said difference in said holding means.

11. In a telemetering system having a buffer memory for receiving data to be transmitted, the method for data compression of a given function of time by a decreasing slope-threshold test comprising the steps of:
testing the slope of said function and producing a voltage signal proportional to a given slope, the polarity of said signal corresponding to the sign of said given slope,
comparing said given slope voltage signal with a symmetric pair of threshold voltages decreasing from initial positive and negative levels with respect to a given reference independent of the reference of said given slope voltage signal,
sampling said function when said given slope voltage signal exceeds either of said threshold voltages,
resetting said threshold voltages to initial positive and negative levels with reference to said given slope voltage signal to begin a search for the next sample of said function to be transmitted in the same manner,
noting the time said function was sampled, and
monitoring the quantity of data being stored in said buffer memory and when it is above a predetermined level, modifying said symmetric pair of threshold voltages to increase the data compression ratio for said function.

12. In a telemetering system having a buffer memory for receiving data to be transmitted, the method of data compression of a periodic sequence $f_n$ of values for a function of time where $n$ is a timing index for said sequence of values, comprising the steps of:
periodically testing the slope of said function and producing a voltage signal proportional to said slope, the polarity of said signal corresponding to the sign of said slope,
comparing said slope voltage signal with a symmetric pair of threshold voltages decreasing from initial positive and negative levels with respect to a given reference independent of the reference of said voltage signal,
sampling said function value at period $n-1$ when said slope voltage signal exceeds either of said threshold voltages, and simultaneously resetting said threshold voltages to initial positive and negative levels with reference to said voltage signal proportional to the slope of said function to begin a search for the next sample of said function to be selected in the same manner,
reading out said timing index for said function value selected, and
monitoring the quantity of data being stored in said buffer memory and when it is above a predetermined level, modifying said symmetric pair of threshold voltages to increase the data compression ratio for said function.